United States Patent [19]

Tamamura

[11] Patent Number: 5,155,511
[45] Date of Patent: Oct. 13, 1992

[54] CAMERA USING FILM WITH MAGNETIC MEMORY

[75] Inventor: Hideo Tamamura, Yokohama, Japan

[73] Assignee: Canon Kabushiki Kaisha, Tokyo, Japan

[21] Appl. No.: 707,072

[22] Filed: May 29, 1991

[30] Foreign Application Priority Data

| May 29, 1990 | [JP] | Japan | 2-137189 |
| May 29, 1990 | [JP] | Japan | 2-137190 |
| Aug. 1, 1990 | [JP] | Japan | 2-205833 |
| May 17, 1991 | [JP] | Japan | 3-140607 |

[51] Int. Cl.⁵ .......................... G03B 29/00
[52] U.S. Cl. ........................ 354/76; 354/105
[58] Field of Search .......... 354/75, 76, 105, 106

[56] References Cited

U.S. PATENT DOCUMENTS

| 4,270,854 | 6/1981 | Stemme et al. | 354/76 |
| 4,977,419 | 12/1990 | Wash et al. | 354/76 |
| 5,028,940 | 7/1991 | Pearson | 354/75 |

*Primary Examiner*—L. T. Hix
*Assistant Examiner*—David M. Gray
*Attorney, Agent, or Firm*—Fitzpatrick, Cella, Harper & Scinto

[57] ABSTRACT

There is provided a camera using a film with a magnetic memory. The camera capable of reading or writing information with respect to the magnetic memory of the film includes a movable member which moves as the film moves while the film is being fed; a magnetic head for reading or writing the information which magnetic head is provided in the movable member and is moveable together with the movable member; and an amplifying circuit for amplifying a signal output from the magnetic head so as to transmit it to a control circuit of the camera which amplifying circuit is provided in the movable member and is movable together with the movable member.

8 Claims, 18 Drawing Sheets

CAMERA USING FILM WITH MAGNETIC MEMORY

BACKGROUND OF THE INVENTION

1. Field of the Invention

The present invention relates to an improvement in a camera which is capable of reading information from a magnetic memory of a film or writing information to it.

2. Related Background Art

U.S. Pat. No. 4977419 and other patents disclose cameras each using a magnetic head to read or write information from or to the magnetic memory of a film.

Such a magnetic memory of a predetermined track width is disposed along the film edge in the direction in which the film is fed. If the film is moved up and down or tilted while information is read from or written to the narrow magnetic memory by the magnetic head, the relative positions of the magnetic head and the magnetic memory are changed, and the information cannot be read or written accurately. For this reason, the applicant of this invention applied for Japanese Patent Application Nos. such as 1-34408 and 2-72111. Each of the applications disclose a camera in which a magnetic head secured to a pressure plate moves as the film moves. The relative positions of the magnetic head and the magnetic memory remain constant. It is thus always possible to accurately read or write information.

The above conventional art, however, has the following problem. Cameras have become smaller in recent years, and magnetic heads and film-feeding motors have been arranged closer to each other. Because of an extremely weak signal output from the magnetic head, noise from the film-feeding motor and other components is carried on the output signal before an amplifying circuit amplifies the output signal. Information is thus read or written incorrectly.

SUMMARY OF THE INVENTION

The present invention has been made in view of the above. The object of the invention is therefore to provide a camera using a film with a magnetic memory that prevents information from being incorrectly read from or written to the magnetic memory of the film, which is caused by noise carried on a weak signal output from a magnetic head before an amplifying circuit amplifies the signal.

To achieve the object, the invention provides a camera capable of reading or writing information from or to a magnetic memory of a film, comprising: a movable member which moves as the film moves while the film is being fed; a magnetic head for reading or writing the information which magnetic head is provided in the movable member and is movable together with the movable member; and an amplifying circuit for amplifying a signal output from the magnetic head so as to transmit it to a control circuit of the camera which amplifying circuit is provided in the movable member and is movable together with the movable member.

The shorter the distance at which the magnetic head is connected to the amplifying circuit, the less noise is likely to be carried on the signal output from the magnetic head. Therefore, the amplifying circuit is provided on the movable member (which moves as the film moves while the film is being fed) so that the amplifying circuit and the movable member can move together. As compared with the length of wiring in the conventional art which connects a movable magnetic head to an amplifying circuit secured to the camera body, the length of wiring extending from the magnetic head to the amplifying circuit in this invention can be made shorter at least to such a degree that the magnetic head and the amplifying circuit can be arranged without obstruction.

Other objects of this invention will be apparent from the following specific embodiments.

DETAILED DESCRIPTION OF THE PREFERRED EMBODIMENTS

The embodiments of the present invention will be described below with reference to the drawings.

Figure 1:
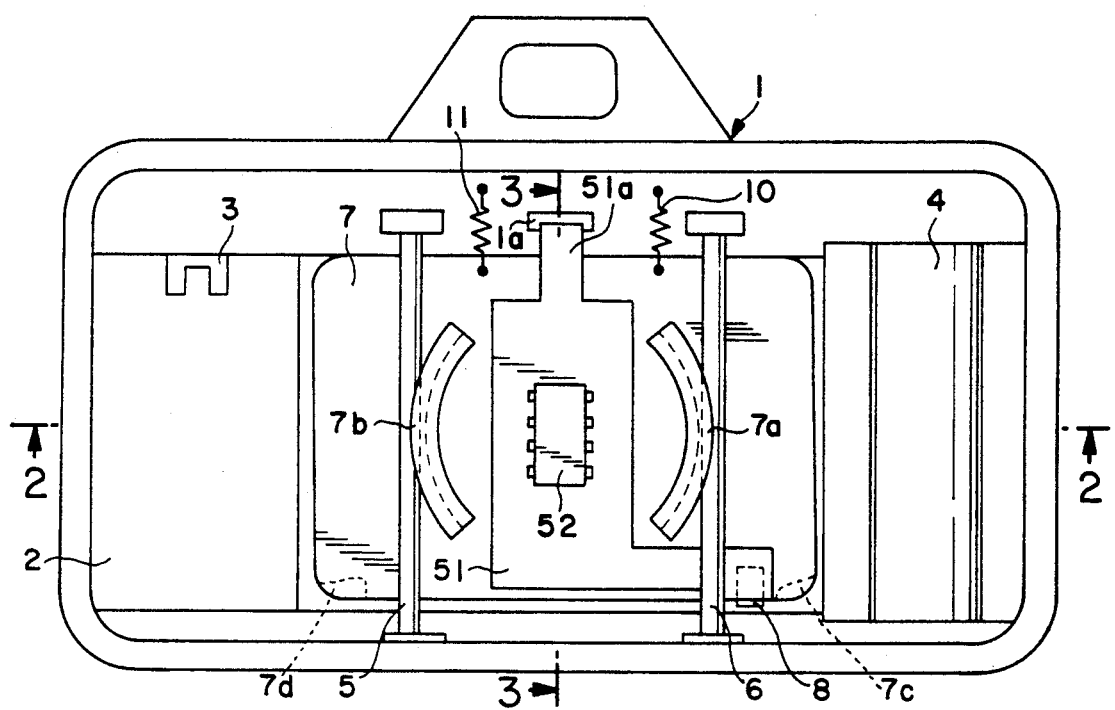
FIG. 1 is a rear view of a camera (with the back cover omitted) according to a first embodiment of the present invention.
Figure 2:
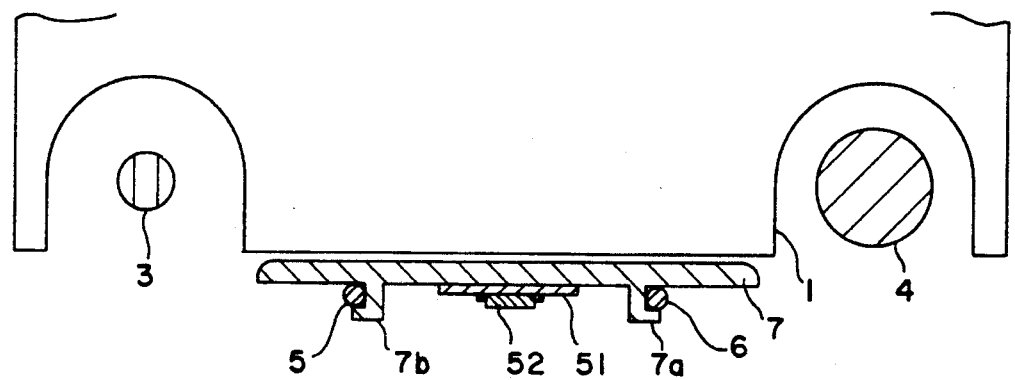
FIG. 2 is a cross-sectional view taken along line 2—2 of FIG. 1.
Figure 3:
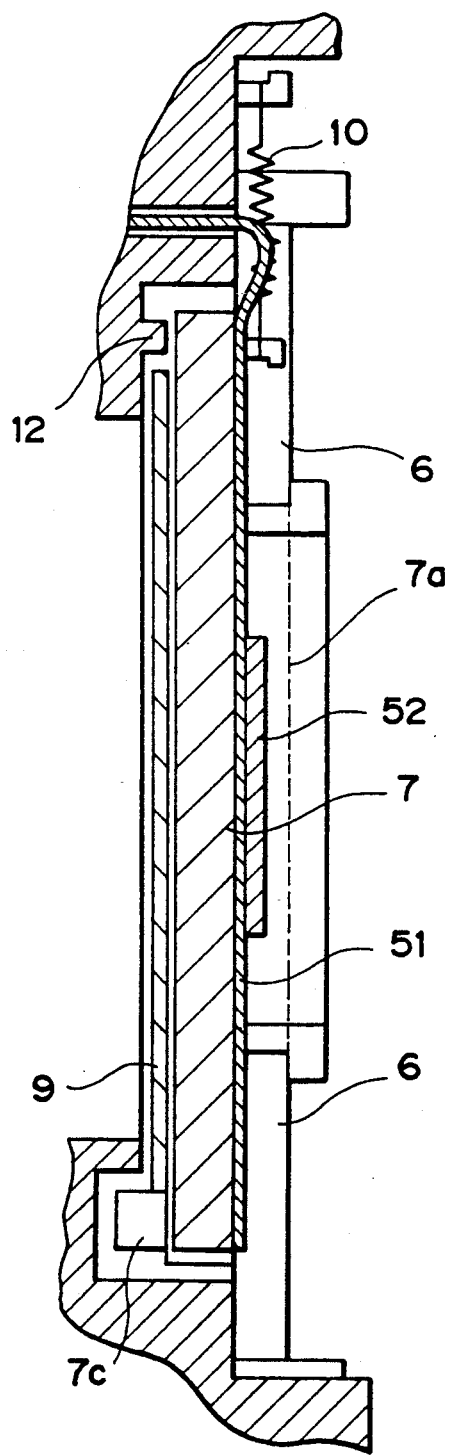
FIG. 3 is a cross sectional view taken along line 3—3 of FIG. 1.
Figure 4:
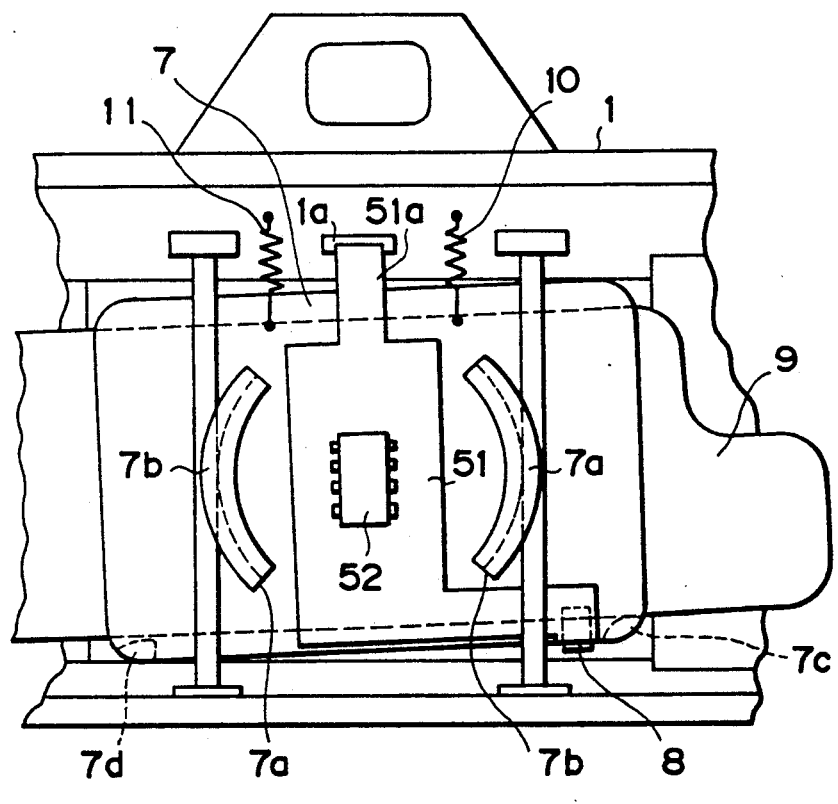
FIG. 4 is a plan view showing the relative positions of a film and a pressure plate of the camera illustrated in FIG. 1.

FIG. 1 is a rear view of a camera (with the back cover omitted) according to a first embodiment of this invention; FIG. 2 is a cross-sectional view taken along line 2—2 of FIG. 1; FIG. 3 is a cross-sectional view taken along line 3—3 of FIG. 1; and FIG. 4 is a plan view showing the relative positions of a film and a pressure plate.

In these drawings, numeral 1 generally denotes a camera body; numeral 2 denotes a cartridge chamber for receiving an unillustrated film cartridge; numeral 3 denotes a film feeding fork which engages with a feeding spool (not shown) of the film cartridge; and numeral 4 denotes a film winding spool for winding a film 9. Numerals 5 and 6 each denote supporting shafts with both of their ends secured to appropriate places of the camera body 1. The supporting shafts 5 and 6 are arranged parallel to each other and perpendicular to the direction in which the film 9 moves (hereinafter referred to simply as a film moving direction). As shown in FIG. 2, the supporting shafts 5 and 6 in this embodiment are formed as cylindrical shafts in cross section.

Numeral 7 denotes a pressure plate, having a magnetic shield effect, which regulates the film surface against the focal plane. As shown in FIG. 2, a pair of rest portions 7a and 7b are provided on the back of the pressure plate (opposite to where the film 9 comes into contact). Each of the rest portions 7a and 7b is composed of a vertical portion which extends vertically from the pressure plate 7 and a horizontal portion, which bends outwardly at right angles with the vertical portion. Each of the rest portions 7a and 7b has a substantially L-shaped cross section, projecting, as a whole, in an optical axis direction. As shown in FIG. 1, the rest portions 7a and 7b are arranged symmetrically at substantially the center of the pressure plate in an arc-like configuration, as viewed from the back.

In this embodiment, the supporting shafts 5 and 6 are positioned in recesses enclosed by the pressure plate 7 and the vertical and horizontal portions of the rest portions 7a and 7b. The pressure plate 7 is thus capable of moving in an up/down direction in the perspective of FIG. 1 with respect to the supporting shafts 5 and 6 (in a direction perpendicular to the film moving direction). The pressure plate 7 is also capable of rotating about the axis determined by the arc of 7a and 7b. As illustrated in FIG. 2, the horizontal portions of the rest portions 7a and 7b clamp the supporting shafts 5 and 6, respectively, thus regulating the position of the pressure plate 7 in the optical axis direction.

As shown in FIGS. 1 and 4, guide members 7c and 7d are integrally attached to lower corners of the front of the pressure plate 7. In addition, a magnetic head 8 is also attached to a lower back of the pressure plate 7 so that the head gap of the magnetic head 8 becomes perpendicular to the film moving direction.

Numerals 10 and 11 denote springs which are arranged on the sides of the film spool 4 and the cartridge chamber 2, respectively, and across the center of the pressure plate 7 about which the pressure plate 7 rotates. One end of each spring is secured to the camera body 1, the other end being secured to the pressure plate 7. The springs 10 and 11 are energized in a direction in which they lift the pressure plate 7. This construction causes the guide members 7c and 7d of the pressure plate 7 to maintain constant contact with the lower end of the film 9. The relative positions of the pressure plate 7 and the film 9 remain constant. A magnetic memory (not shown) is disposed on a surface of the film 9 facing the pressure plate 7. The magnetic head 8 reads or writes a variety of information regarding photography.

As shown in FIGS. 1 and 4, a tapered surface extending toward the cartridge chamber 2 is formed in each of the guide members 7c and 7d. Because of the tapered surfaces, when the film 9 is drawn from the unillustrated film cartridge housed in the cartridge chamber 2, it pushes the guide members 7c and 7d smoothly and downwardly against the upward force of the springs 10 and 11.

Numeral 12 designates an external rail (see FIG. 3) regulating the top portion of the film 9. Numeral 51 designates a flexible printed circuit board secured to the pressure plate 7. An amplifying circuit 52, such as TL592B made by Texas Instruments, which amplifies a signal output from the magnetic head 8, is attached to the flexible printed circuit board 51. The amplifying circuit 52 moves together with the pressure plate 7.

Figure 5:
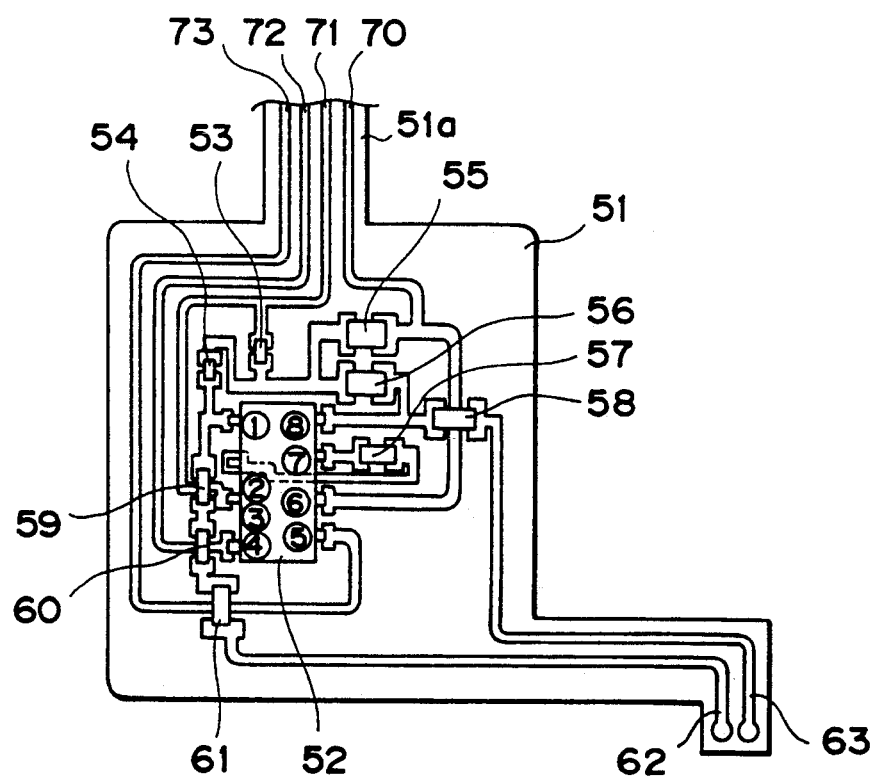
FIG. 5 is a view showing the structure of the surface of a flexible printed circuit board illustrated in FIG. 1.

FIG. 5 is a view showing the structure of the surface of the above flexible printed circuit board. Numerals 70, 71, 72 and 73 all indicate signal patterns for connecting the amplifying circuit to an unillustrated camera control circuit or the like in the camera body 1. The signal pattern 70 is connected to ground; the signal pattern 71 is connected to a power supply circuit; and the signal patterns 72 and 73 are connected to the camera control circuit. Numerals 62 and 63 also indicate signal patterns to which the output terminals of the magnetic head are individually soldered.

Figure 6:
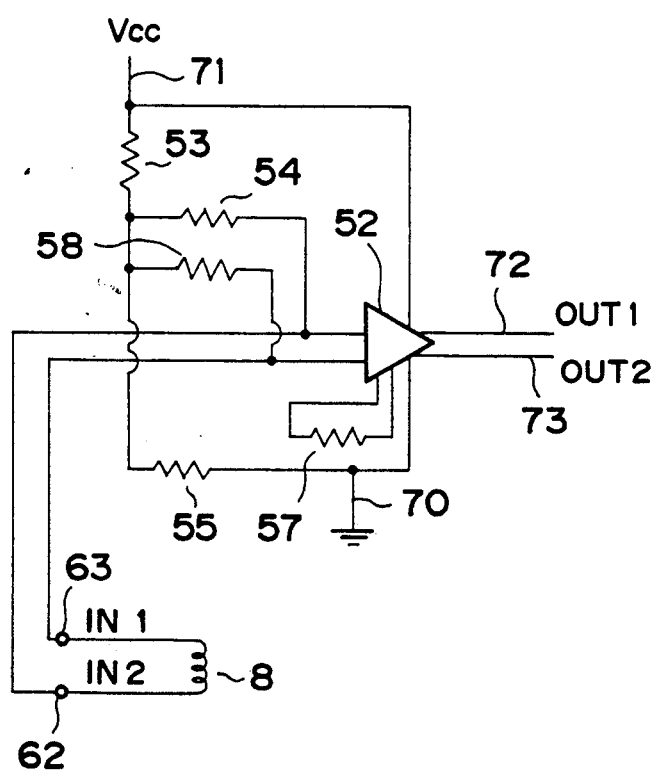
FIG. 6 is a circuit diagram of the circuitry on the flexible printed board shown in FIG. 5.

Numerals 53, 54, 55, 56 and 57 all indicate chip resistors, and numerals 58, 59, 60 and 61 all indicate chip jumper wires. FIG. 6 shows the circuits of these components.

A user opens the back cover (not shown) pivotally affixed to the end on one side of the camera body 1 to load the film cartridge (not shown) into the cartridge chamber 2. As disclosed in Japanese Patent Application No. 63-220049, such a film cartridge is constructed in the following way. When it is not used, an entire film strip including the leader thereof is inside the film cartridge. The film cartridge is loaded into the camera body 1, and the back cover is closed. The film is not forced out of the film cartridge until the film feeding fork 3 begins to transmit operational torque.

Under these conditions, when an unillustrated motor rotates the film feeding fork 3 counterclockwise as shown in FIG. 2, the feeding spool (not shown) engaged with the fork 3 is also rotated counterclockwise. The film 9 is thereby forced out of the film cartridge, and the leader of the film 9 begins to move into a gap between the camera body 1 and the pressure plate 7. When the film 9 moves further to the right side of FIG. 1, the spring 11 and the guide member 7d first regulate the left sides of the pressure plate 7 and the film 9. When the film 9 moves further, the spring 10 and the guide member 7c then regulate the right sides of the pressure plate 7 and the film 9. While the film 9 is moving, it passes the magnetic head 8, whereby the gap at the top of the magnetic head 8 comes into contact with the magnetic memory (not shown) of the film 9, thus making it possible to read or write information regarding photography. The leader of the film 9 is eventually wound around the film winding spool 4. The motor (not shown) then rotates the film winding spool 4. This rotation of the film winding spool 4 alone winds the film 9 in the same manner as in well-known cameras.

Even if the film 9 goes upward or downward while it is being fed, the pressure plate 7 can both move perpendicularly to the film moving direction, and rotate in parallel with the film surface. Because the springs 10 and 11 press the guide members 7c and 7d of the pressure plate 7 against the lower end of the film 9, the pressure plate 7 is capable of moving accurately as the film 9 is moved. The magnetic head 8 moves together with the pressure plate 7. Therefore, the head gap of the magnetic head 8 can always come into contact with the magnetic memory at right angles with the film feeding direction.

Thus, the magnetic head 8 reads or writes information from or to the magnetic memory of the film 9. The signal output from the magnetic head 8 is weak and very susceptible to noise until it is amplified by the amplifying circuit 52.

In this embodiment, however, the signal output from the magnetic head 8 is prevented from being adversely affected by noise caused by the motor (not shown) or the like, which feeds the film 9, because the amplifying circuit 52 is secured to the pressure plate 7. Output lines (signal patterns 62 and 63) connecting the magnetic head 8 to the amplifying circuit 52 are made so short that the pressure plate 7 and the amplifying circuit 52 can move together, thereby reducing the space for the relative movement of the head and the amplifying circuit. The flexible printed circuit board 51 with the amplifying circuit 52 is mounted on an opposite surface of the pressure plate 7 having an electrical shield effect to the noise source such as film feeding motor and the like.

Because the flexible printed circuit board 51 is affixed to the pressure plate 7, it is also possible to effectively utilize a "dead space" between the supporting shafts 5 and 6 mentioned above. It also allows easy installation.

Figure 7:
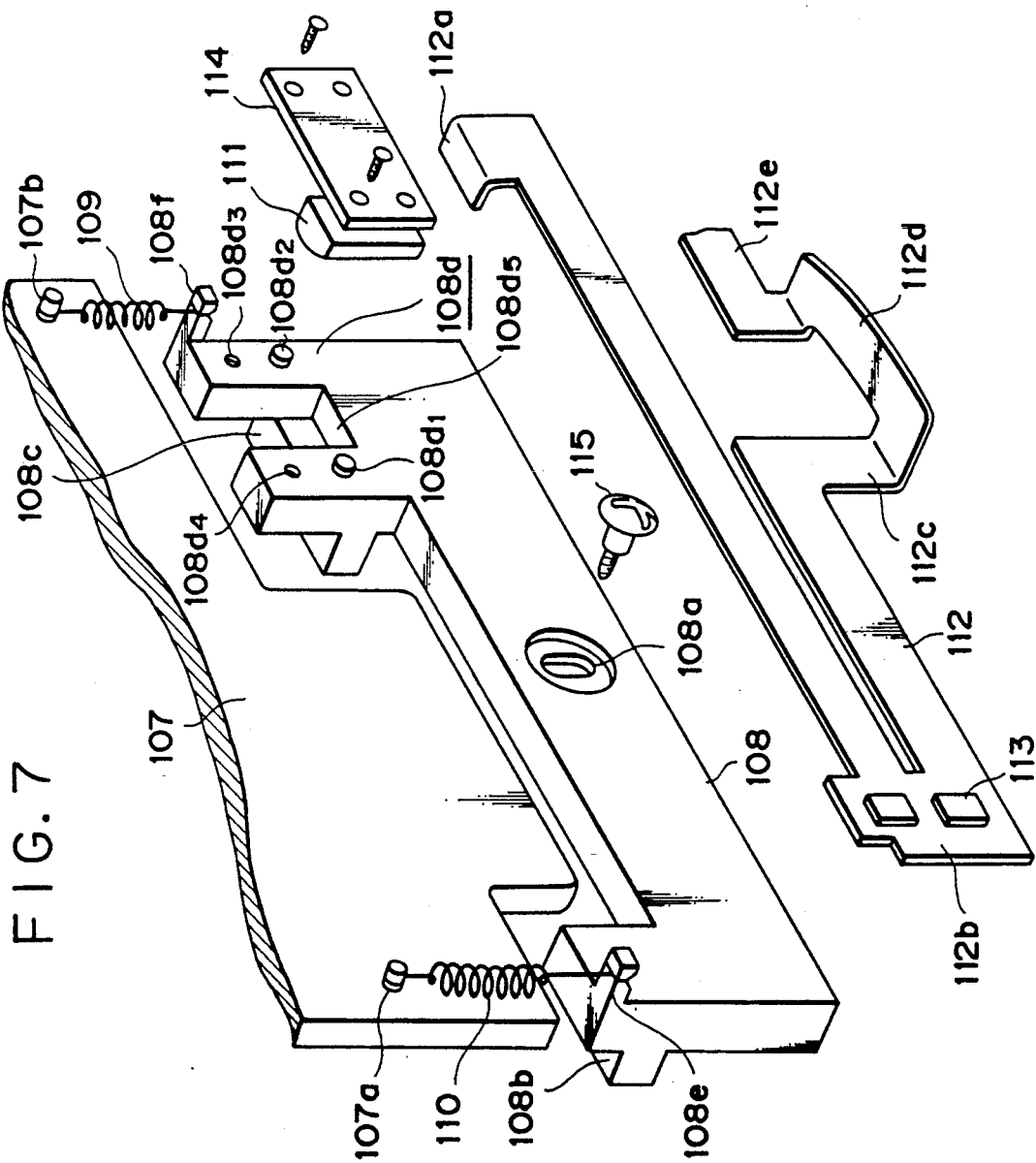
FIG. 7 is a perspective view essentially showing the structure of a camera in FIG. 8 according to a second embodiment of this invention.
Figure 8:
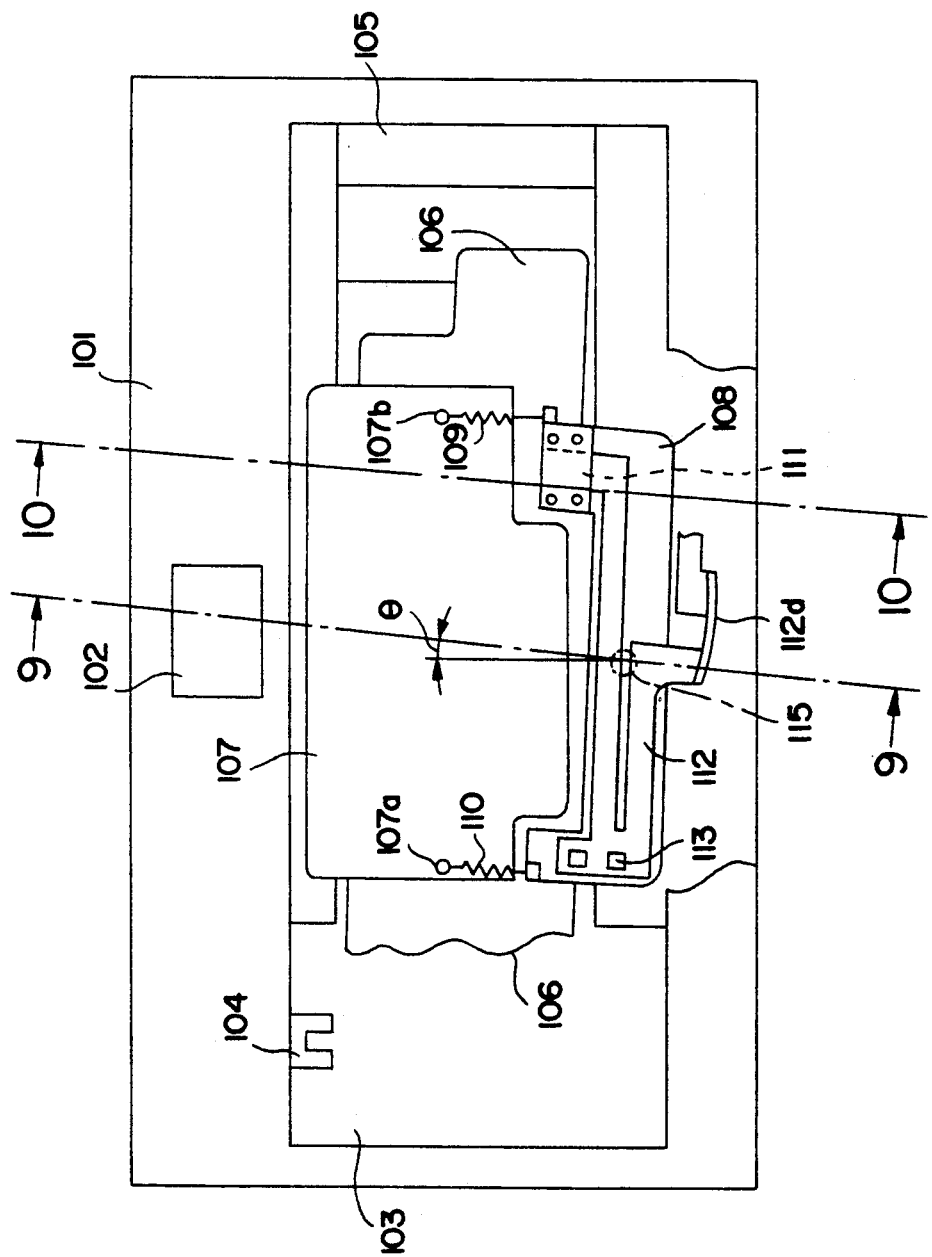
FIG. 8 is a rear view of the camera.
Figure 9:
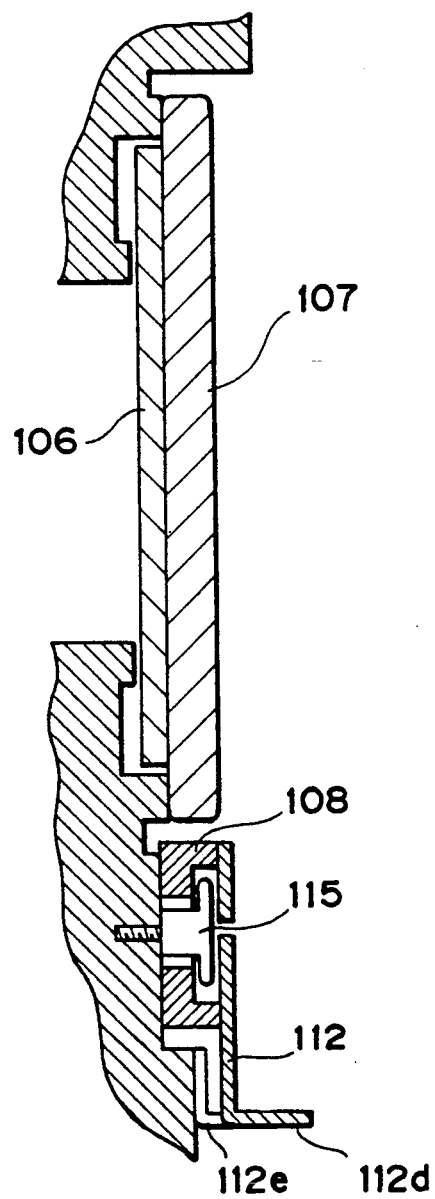
FIG. 9 is a cross-sectional view taken along line 9—9 of FIG. 8.
Figure 10:
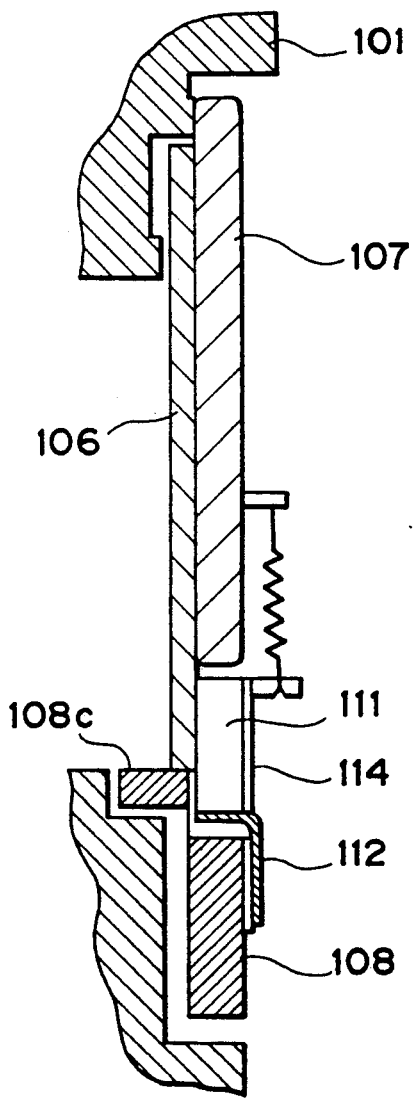
FIG. 10 is a cross-sectional view taken along line 10—10 of FIG. 8.

FIGS. 7 through 10 show a second embodiment of the present invention. FIG. 7 is a perspective view essentially showing the structure of a camera in FIG. 8; FIG. 8 is a rear view of the camera; FIG. 9 is a cross-sectional view taken along line 9—9 of FIG. 8; and FIG. 10 is a cross-sectional view taken along line 10—10 of FIG. 8.

In these drawings, numeral 101 denotes a camera body; numeral 102 denotes a finder; numeral 103 denotes a cartridge chamber; and numeral 104 denotes a fork. Numeral 105 denotes a spool chamber; numeral 106 denotes a film with a magnetic memory; and numeral 107 denotes a pressure plate provided with springs 109 and 110 having spring hooks 107b and 107a, respectively. Numeral 108 denotes a head fixing member which is secured to the camera body 101 by a screw 115 at a hole 108a. Because the hole 108a has an oblong configuration, the head fixing member 108 can both rotate about the screw 115 and move up and down. The head fixing member 108 is provided with projections 108b and 108c both in contact with the lower end of the film 106. Since it is pulled by the springs 109 and 110 attached to spring hooks 108e and 108f, the head fixing member 108 is always capable of moving as the film 106 moves. The head fixing member 108 is also provided with a head fixing portion 108d composed of two projections $108d_1$ and $108d_2$, two screw holes $108d_3$ and $108d_4$, and a head fixing opening $108d_5$. A retaining plate 114 for retaining a magnetic head 111 is fitted into the head fixing portion 108d by the screws at the screw holes $108d_3$ and $108d_4$. The magnetic head 111 reads or writes information stored in the magnetic memory of the film 106. The pressure plate 107 is shaped to allow the maximum movement of the head fixing member 108 so that the film guide portion (projections 108b, 108c) can maintain contact with the film 106 and the head fixing member 108 can cope as much as possible with various movements such as a tilt of the film 106. The operational axis (the screw 115) of the head fixing member 108 is positioned substantially at the center of the head fixing member 108.

Numeral 112 designates a flexible printed circuit board composed of a connecting portion 112a, a portion 112b, a wiring portion 112c, a bent portion 112d, and a fixing portion 112e. The connecting portion 112a is connected to the magnetic head 111. An amplifying circuit for amplifying the outputs from the magnetic head 111 is attached to the portion 112b. The wiring portion 112c is used for wiring on a control circuit side in the camera body 101. The fixing portion 112e is adhered to the camera body 101. The wiring portion 112c and the bent portion 112d are not adhered to any components. The connecting portion 112a and the portion 112b to which the amplifying circuit is attached are mounted to the head fixing member 108.

The magnetic head 111 and the amplifying circuit 113 are disposed on the right and left sides of the head fixing member 108, respectively, so as to balance the head fixing member 108.

In the above construction, as illustrated in FIG. 8, as the film 106 moves on the pressure plate 107 tilting at an angle of θ, the head fixing member 108, to which the magnetic head 111 is secured, is rotated by an angle corresponding to θ. This is because the lower end of the film 106 presses the projections 108b and 108c, thereby rotating these projections (also at an angle corresponding to θ) against the pulling force acting on the springs 109 and 110. At this stage, as shown in FIG. 8, the left side of the bent portion 12d (of the flexible printed circuit board 112) smoothly moves upwardly, whereby the head fixing member 108 can move without obstruction.

As the head fixing member 108 moves up and down, the bent portion 112d also moves up and down, without hindering the smooth movement of the head fixing member 108. The wiring portion 112c used for connecting to the side of the camera body 101 is disposed substantially at the center of the head fixing member 108 (close to the operational axis (the screw 115)). It is therefore possible to reduce the amount of movement by the flexible printed circuit board 112 as the head fixing member 108 moves.

Since the weight of the head fixing member 108 is substantially equally distributed to the right and left sides of the operational axis (screw 115), even if the film 106 moves suddenly, the head fixing member 108 is not excessively rotated, thus making it possible to cope with such a movement without delay.

Figure 11:
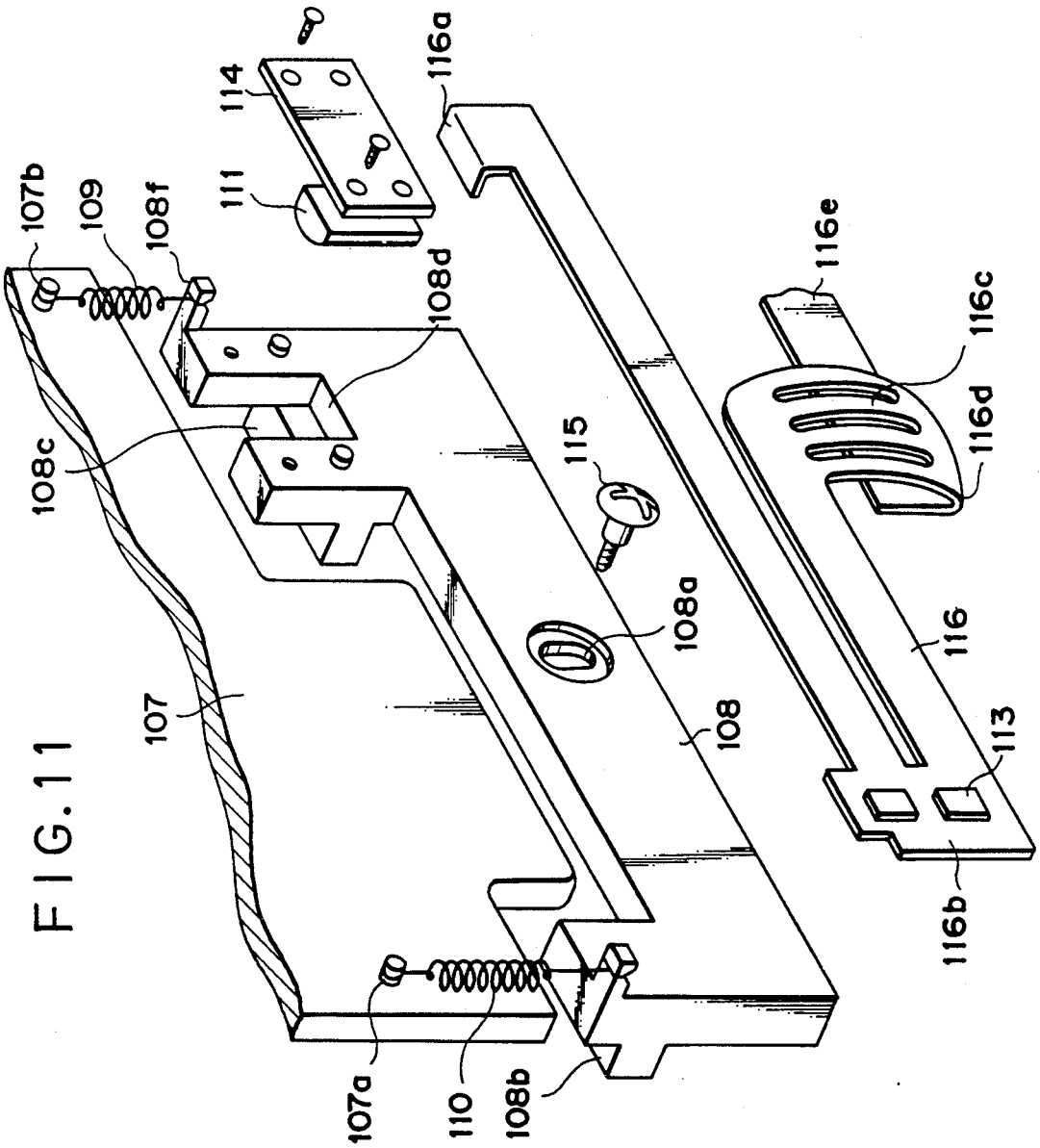
FIG. 11 is a perspective view essentially showing the structure of a camera in FIG. 12 according to a third embodiment of the invention.
Figure 12:
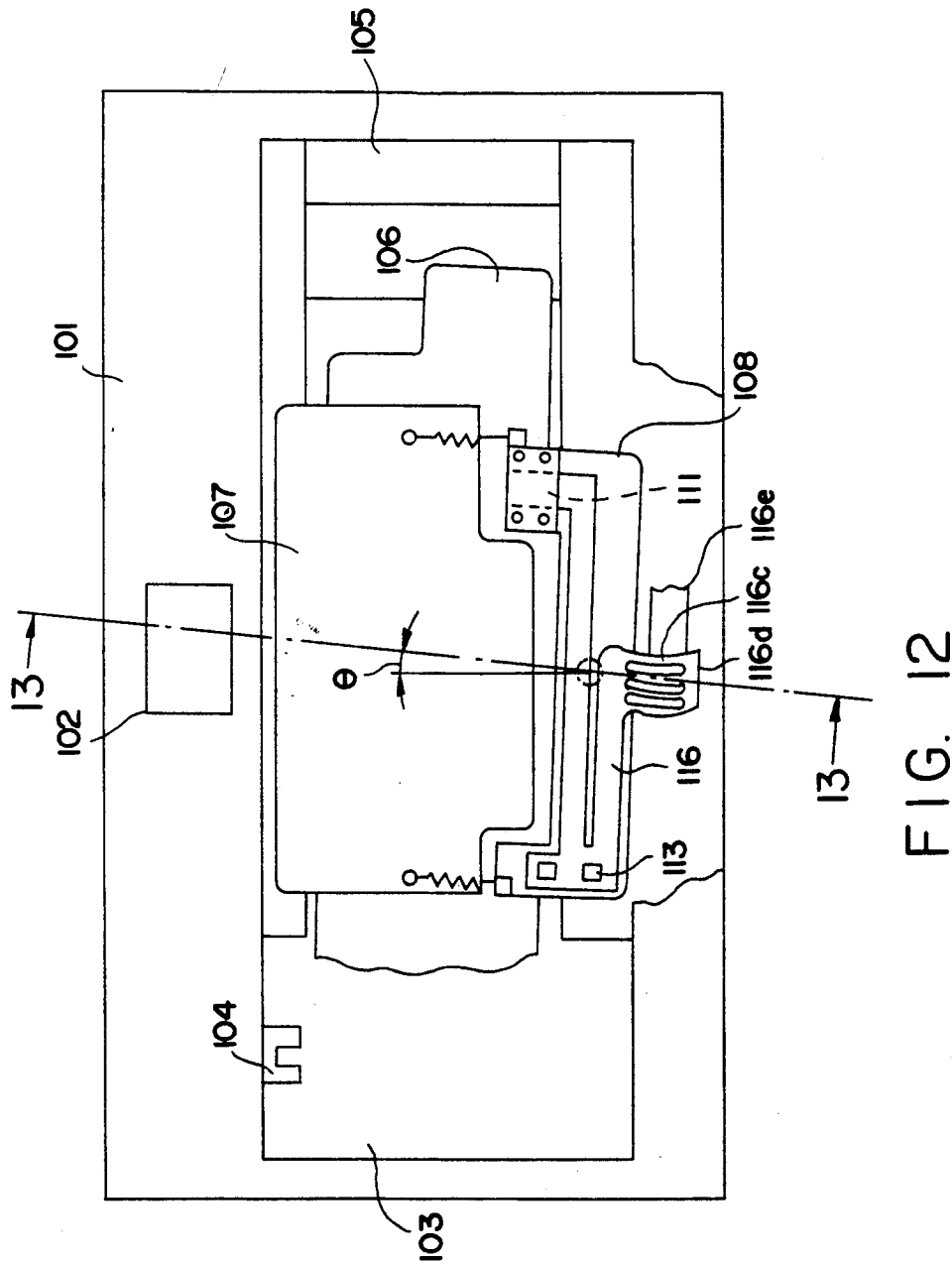
FIG. 12 is a rear view of the camera.
Figure 13:
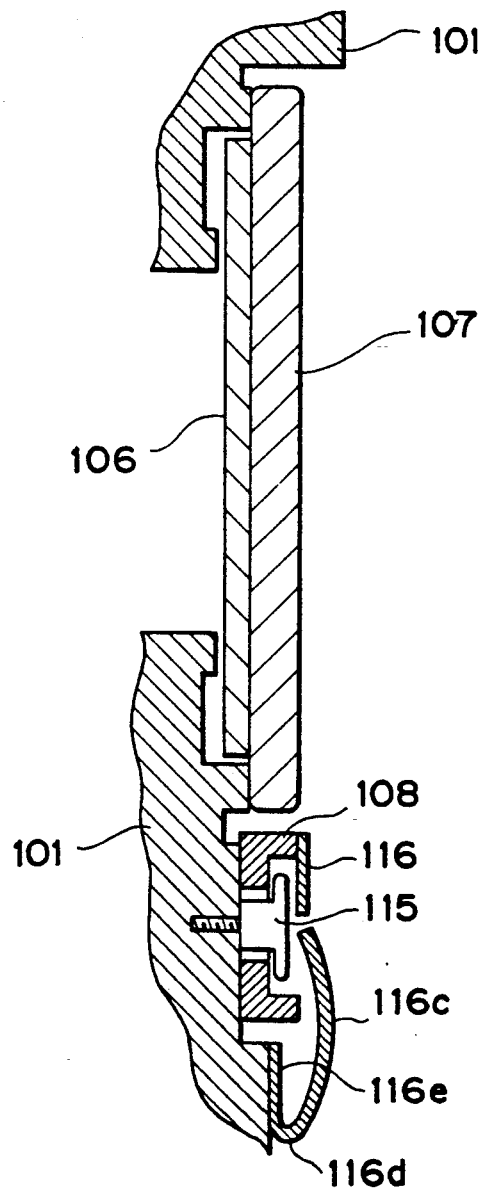
FIG. 13 is a cross-sectional view taken along line 13—13 of FIG. 12.

FIGS. 11 through 13 show a third embodiment. FIG. 11 is a perspective view essentially showing the structure of a camera in FIG. 12; FIG. 12 is a rear view of the camera; and FIG. 13 is a cross-sectional view taken along line 13—13 of FIG. 12. The same components as those in FIGS. 7 through 10 are denoted by the identical reference numbers in FIGS. 11 through 13, in which numeral 116 designates a flexible printed circuit board composed of a connecting portion 116a, a portion 116b, a wiring portion 116c, a bent portion 116d, and a fixing portion 116e. The connecting portion 116a is connected to the magnetic head 111. An amplifying circuit for amplifying the outputs from the magnetic head 111 is attached to the portion 116b. The wiring portion 116c is used for wiring on the side of a control circuit in a camera body 101. The fixing portion 116e is adhered to the camera body 101. The wiring portion 116c and the bent portion 116d are adhered to no components. The connecting portion 112a and the portion 112b, to which the amplifying circuit is attached, are mounted to the head fixing member 108.

As shown in FIG. 11, slits are formed in the wiring portion 116c (of the flexible printed circuit board 116, the wiring portion 116c being used for wiring on the side of the camera body 101). Because of the slits the flexible printed circuit board 116 can bend very easily. As illustrated in FIG. 13, the wiring portion 116c is brought toward the camera body 101 so as to substantially form the shape of an "R." The fixing portion 116e formed continuously from the bent portion 116d is then bent and adhered to the camera body 101. The wiring portion 116c having its flexible R-shaped face thereby absorbs an up/down movement of the head fixing member 108. Because of the slits, the wiring portion 116c is flexible and can change its shape when the head fixing member 108 is rotated as shown in FIG. 12. The head fixing member 108 is not hindered from moving when the film 106 moves.

The third embodiment is the same as the second embodiment except the features described above.

Figure 14:
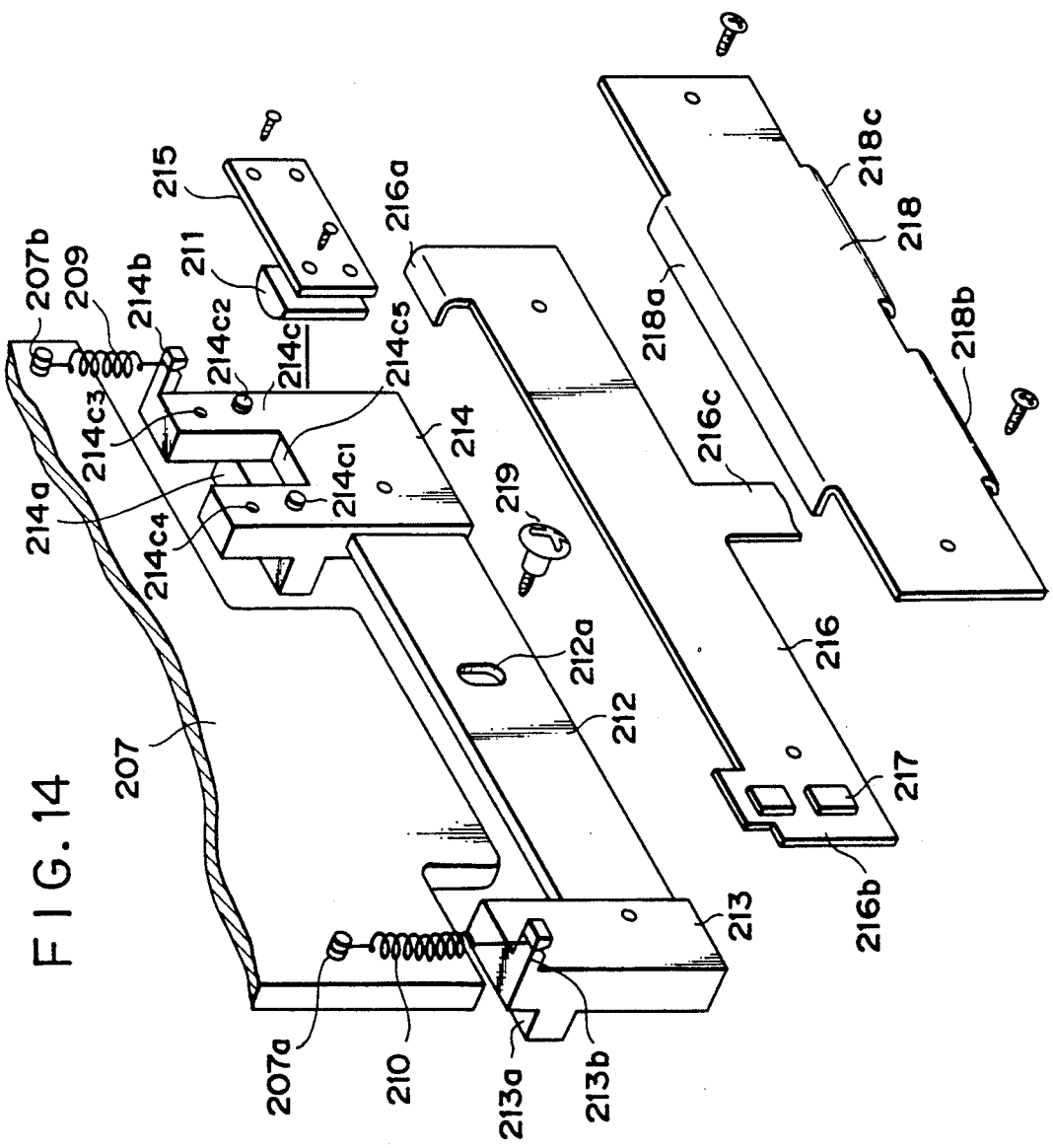
FIG. 14 is a perspective view essentially showing the structure of a camera in FIG. 15 according to a fourth embodiment of this invention.
Figure 15:
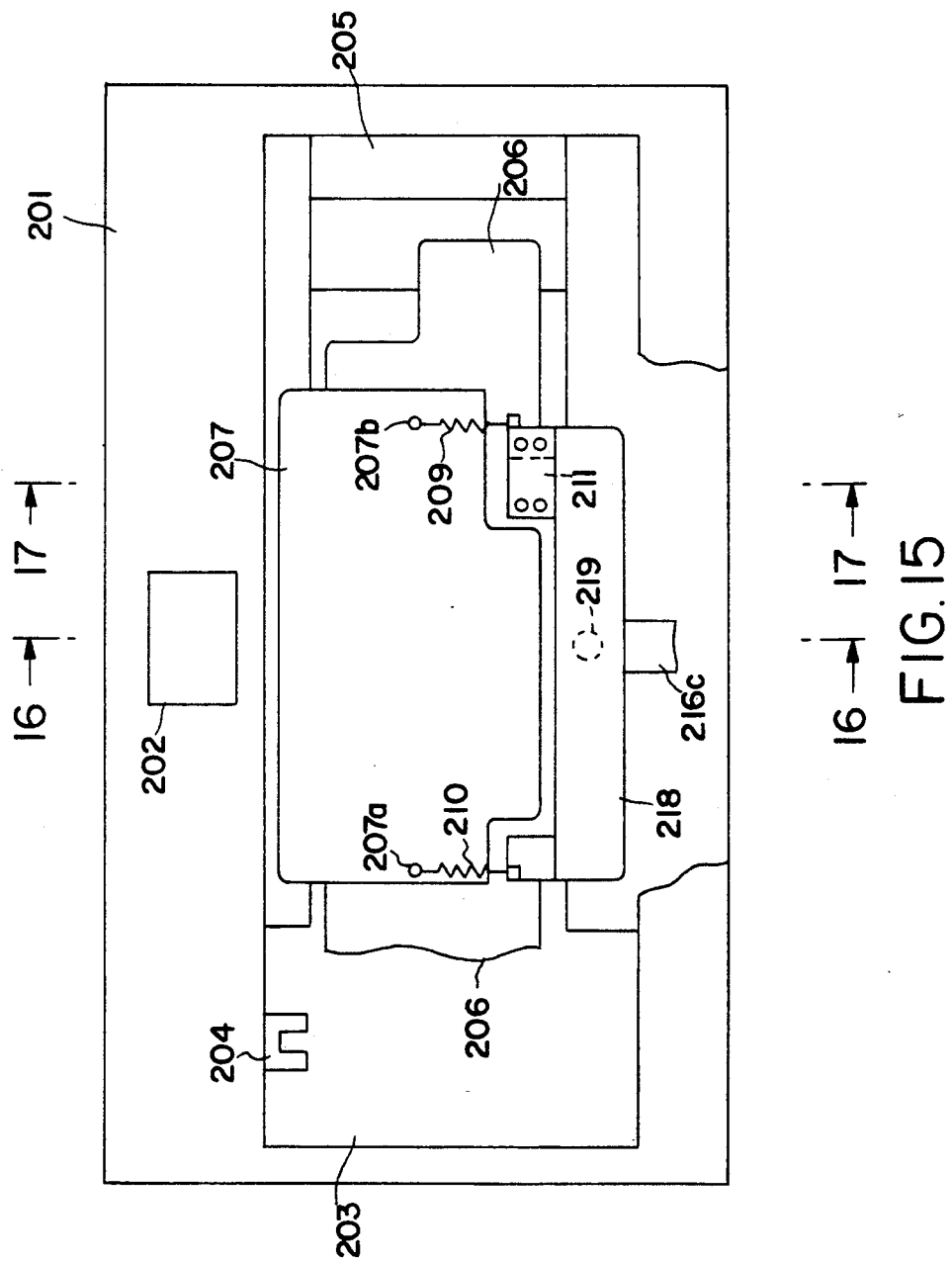
FIG. 15 is a rear view of the camera.
Figure 16:
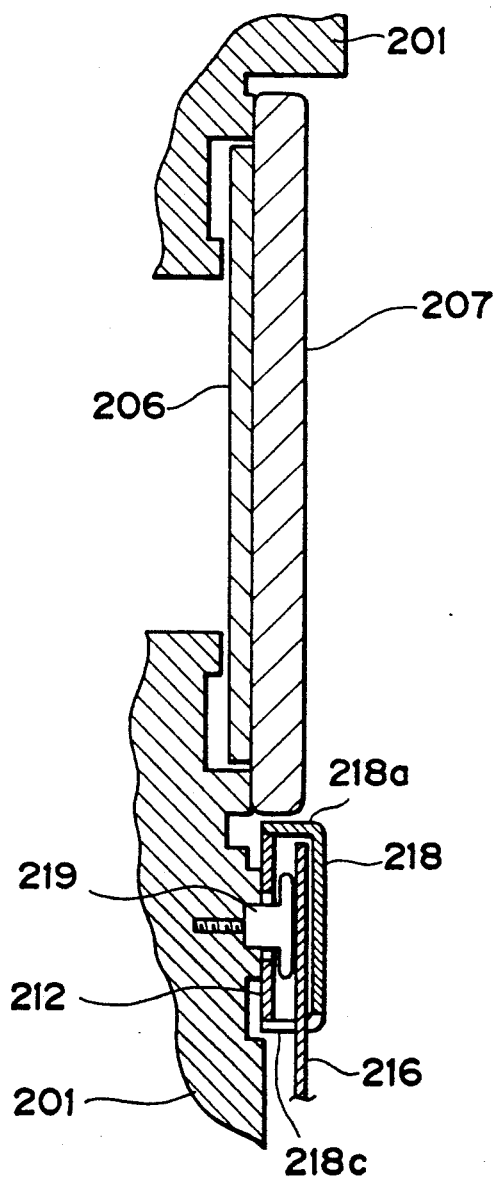
FIG. 16 is a cross-sectional view taken along line 16—16 of FIG. 15.
Figure 17:
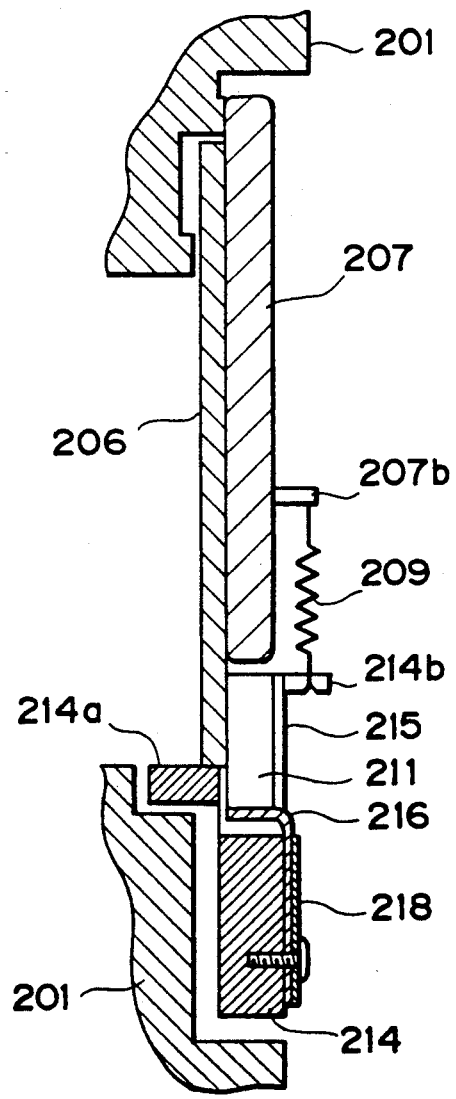
FIG. 17 is a cross-sectional view taken along line 17—17 of FIG. 15.

FIGS. 14 through 17 show a fourth embodiment of the present invention. FIG. 14 is a perspective view essentially showing the structure of a camera in FIG. 15; FIG. 15 is a rear view of the camera; FIG. 16 is a cross-sectional view taken along line 16—16 of FIG. 15; and FIG. 17 is a cross-sectional view taken along line 17—17 of FIG. 15.

In these drawings, numeral 201 designates a camera body; numeral 202 designates a finder; numeral 203 designates a cartridge chamber; and numeral 204 designates a fork. Numeral 205 designates a spool chamber; numeral 206 designates a film with a magnetic memory; and numeral 207 designates a pressure plate provided with springs 209 and 210 having spring hooks 207b and 207a, respectively. Numerals 213 and 214 designate members which play not only the role of guiding a film 206, but also the role of serving as bases of a flexible printed circuit board, described below. The member 213 has a projection 213a in contact with the lower end of the film 206, and a spring hook 213b of the spring 210. The member 214 has a projection 214a also in contact with the lower end of the film 206, a spring hook 214b of the spring 209, and a head fixing portion 214c. The head fixing portion 214c is composed of a head fixing opening $214c_5$, two projections $214c_1$ and $214c_2$, and two screw holes $214c_3$ and $214c_4$. Numeral 212 designates a shield plate having a "magnetic shield effect." The members 213 and 214 are arranged on both sides of the shield plate 212 so as to form an integral structure. These components are typically formed by a molding method such as an insert molding method. A hole 212a is bored at the center of the shield plate 212 which is assembled to the camera body 201 by a screw 219. Because the hole 212a has an oblong configuration, the shield plate 212, together with the members 213 and 214, can move up and down and rotate about the screw 219. Also, because the shield plate 212 is pulled by the springs 209 and 210, hooked by the springs hooks 213b and 214b, it can always move whenever the film 206 moves. A retaining plate 215 by which a magnetic head 211 is held is fitted to the projections $212c_1$ and $212c_2$ in the head fixing portion 214c of the member 214. The retaining plate 215 is positioned and fixed to the head fixing portion 214c by screws at holes $214c_3$ and $214c_4$.

Numeral 216 designates the flexible printed circuit board for wiring the magnetic head 211, an amplifying circuit 217, and an unillustrated control circuit on the side of the camera body 201. The amplifying circuit 217 is used for amplifying the output from the magnetic head 211. The flexible printed circuit board 216 is provided with the magnetic head 211 secured to the shield board 212, a connecting portion 216a, a portion 216b to which the amplifying circuit portion 217 is attached, and a wiring portion 216c for wiring on the side of the control circuit of the camera body 201. Numeral 218 designates another shield plate having a "magnetic shield effect." As clearly shown in FIG. 16, the shield plate 218 has bent portions 218a, 218b and 218c to avoid as much as possible the intrusion of noise into the flexible printed circuit board 216. The shield plate 218 is affixed to the above members 213 and 214 by a screw through the printed circuit board 216.

As described in the above embodiment, the flexible printed circuit board 216 is covered by the shield plates 212 and 218 in a box-like manner. It is therefore possible to reduce noise which is likely to be carried on the output from the magnetic head 211 to the amplifying circuit 217.

Figure 18:
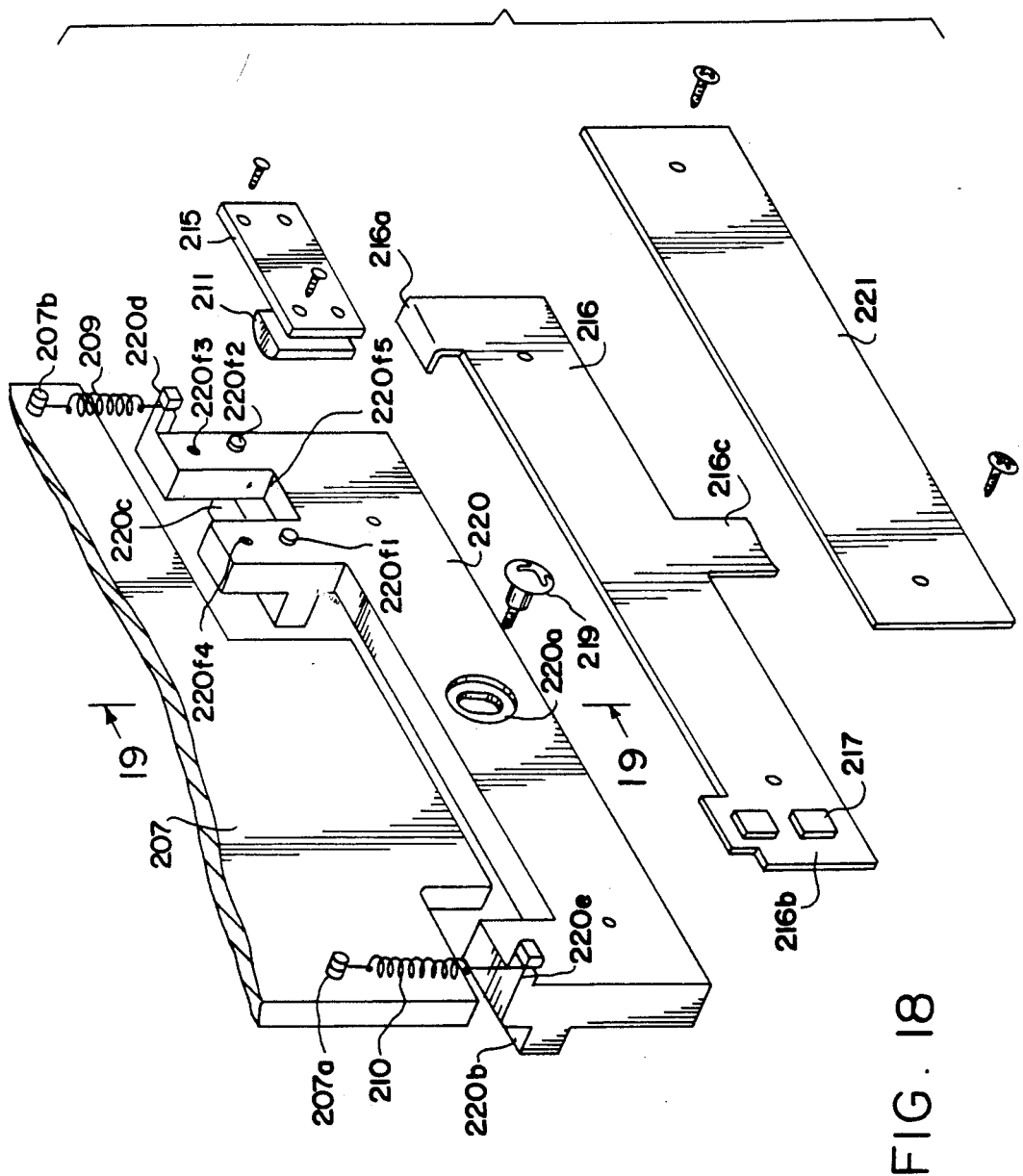
FIG. 18 is a perspective view essentially showing the structure of a camera according to a fifth embodiment of the invention.
Figure 19:
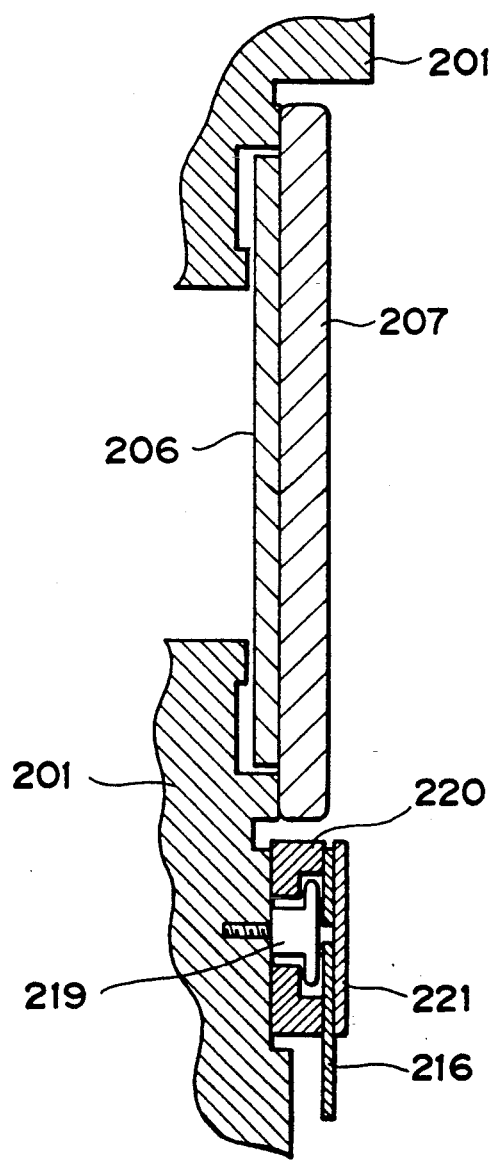
FIG. 19 is a cross-sectional view taken along line 18—18 of FIG. 18.

FIGS. 18 and 19 show a fifth embodiment. FIG. 18 is a perspective view essentially showing the structure of a camera, and FIG. 19 is a cross-sectional view taken along line 19—19 of FIG. 18. The same components as those in the fourth embodiment are denoted by the identical reference numbers in FIGS. 18 and 19.

Numeral 220 denotes a shield plate. A plastic material is formed into the shield plate 220 with portions corresponding to the shield plate 212, and the members 213 and 214 of the fourth embodiment. Noise is likely to be carried on the output from the magnetic head 211, if the shield plate 212 is simply made of a plastic material. Therefore, a plastic material with carbon fibers or that onto which an electrically-conductive coating is applied may be utilized as the shield plate 220. Numeral 221 denotes another shield plate having a "shield effect." The shield plate 221 is fixed to the shield plate 220 by screws. A flexible printed circuit board 216 is sandwiched between the two shield plates 220 and 221.

In the fifth embodiment, because the flexible printed circuit board 216 is sandwiched between the shield plates 220 and 221, it is also possible to reduce noise which is likely to be carried on the output from the magnetic head 211 to the amplifying circuit 217. The magnetic head 211 is thus always capable of reading or writing information accurately.

The fifth embodiment is the same as the fourth embodiment except for the feature mentioned above.

What is claimed is:

1. A camera capable of reading or writing information with respect to a magnetic memory of a film, comprising:
    a movable member which moves as the film moves while the film is being fed;
    a magnetic head for reading or writing the information which magnetic head is provided in said movable member and is movable together with said movable member; and
    an amplifying circuit for amplifying a signal output from said magnetic head and for transmitting it to a control circuit of the camera which amplifying circuit is provided in said movable member and is movable together with said movable member.

2. A camera according to claim 1, wherein said movable member has a magnetic shield function.

3. A camera according to claim 2 further comprising a shield member for covering a space between said magnetic head and said amplifying circuit, said shield member being provided in said movable member.

4. A camera according to claim 1 further comprising a shield member for covering the space between said magnetic head and said amplifying circuit, said shield member being provided in said movable member.

5. A camera according to claim 1, wherein said movable member includes a pressure plate.

6. A camera according to claim 1, wherein said movable member includes a member for regulating the film surface against the focal plane film is exposed.

7. A camera according to claim 1, wherein said magnetic head and said amplifying circuit are well-balanced in weight with respect to the center at which said movable member operates.

8. A camera according to claim 1, wherein an output line of said amplifying circuit is connected to a camera body from a vicinity of the center at which said movable member operates.

* * * * *